April 4, 1967 G. T. McKINDLES ET AL 3,312,943
COMPUTER ORGANIZATION
Filed Feb. 28, 1963 2 Sheets-Sheet 1
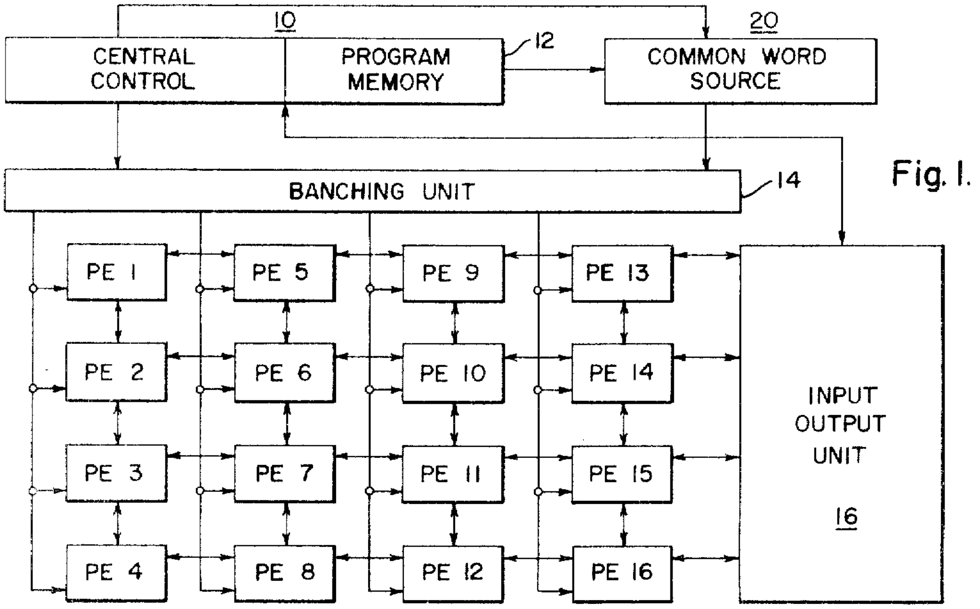
Fig. I.
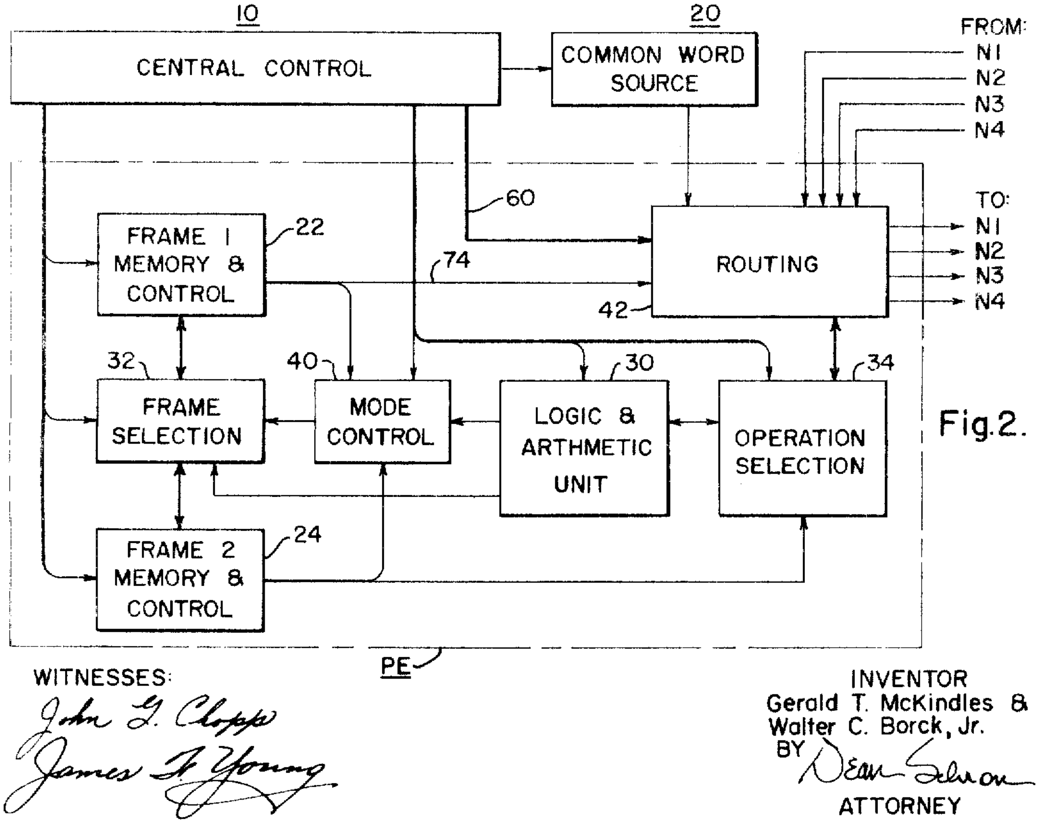
Fig.2.
WITNESSES:
John G. Clopp
James F. Young
INVENTOR
Gerald T. McKindles &
Walter C. Borck, Jr.
BY Dean Salmon
ATTORNEY

United States Patent Office 3,312,943

Patented Apr. 4, 1967

3,312,943

COMPUTER ORGANIZATION

Gerald T. McKindles, Catonsville, and Walter C. Borck, Jr., Baltimore, Md., assignors to Westinghouse Electric Corporation, Pittsburgh, Pa., a corporation of Pennsylvania Filed Feb. 28, 1963, Ser. No. 261,783
6 Claims. (Cl. 340—172.5)

This invention in general relates to parallel network type computers, and more particularly to means for facilitating certain mathematical and logical operations performed by such computers.

Many mathematical problems are best adapted to be solved by a parallel type of computation and to this end there has been proposed parallel network type computers wherein a central control unit will simultaneously control a plurality of individual and similar processing elements. The processing elements are generally arranged in a matrix type of an array and possess the capability of communicating, that is, transfering information to other preselected processing elements of the array such as its nearest neighbor processing elements. A central control means decodes instructions generally stored in a central program memory and provides a plurality of control signals which are fed to each of the processing elements of the array such that each will carry out the operation as specified by the control signals on information stored within memory means associated with each processing element. These processing elements are then capable of executing, simultaneously, all logical and mathematical operations upon information, or operands, stored within themselves, or within a neighboring processing element. Means may additionally be provided to place preselected processing elements into different modes of operation, depending upon conditions internal to the processing element, such that the processing elements may alter control signal from the central control means and will carry out designated instructions only if the certain predetermined conditions are met. In order to load the memory means associated with each processing element with information, there is generally provided input-output means which may load information into the processing elements along an edge of the matrix array and which information is then shifted across the matrix array until all the desired data are loaded into the individual memory means. The solution to a great number of mathematical problems requires the use of a constant word (which is generally a number), and this constant is loaded into the memory means of each processing element. The solution of various problems might require the loading of many constants into the memory means of each processing element, which procedure takes additional time and requires the use of additional space in each memory means.

It is therefore, one object of the present invention to provide a parallel network type computer in which the time for loading information is reduced.

It is a further object to provide a parallel network type of computer having individual memory means associated with a plurality of processing elements wherein the capacity of the memory means is effectively increased.

It is an additional object to provide a parallel network type of computer which may solve problems involving constants at a faster rate.

Briefly, in accordance with the above objects, the broad concept of the invention comprises means associated with the processing elements of a parallel network computer, which means, is operable to store a constant to be used by the processing elements in various mathematical computations, and to transmit the constant to selected processing elements of the matrix array simultaneously for use in computations. The objects, and the basic concept, are accomplished in the present invention, one illustrative embodiment of which comprises a common word source, which may include a shift register and is under control of a central control means. The common word source may be loaded with data from a central program memory, or if desired, from any external source such as input-output means.

The above stated and further objects of the present invention will become apparent upon a reading of the following detailed specification taken in conjunction with the drawings, in which:

FIGURE 1 is a block diagram illustrating a basic array of processing elements under simultaneous control of a central control unit, and incorporating the present invention;

FIG. 2 is a block diagram illustrating a typical processing element;

Figure 3:
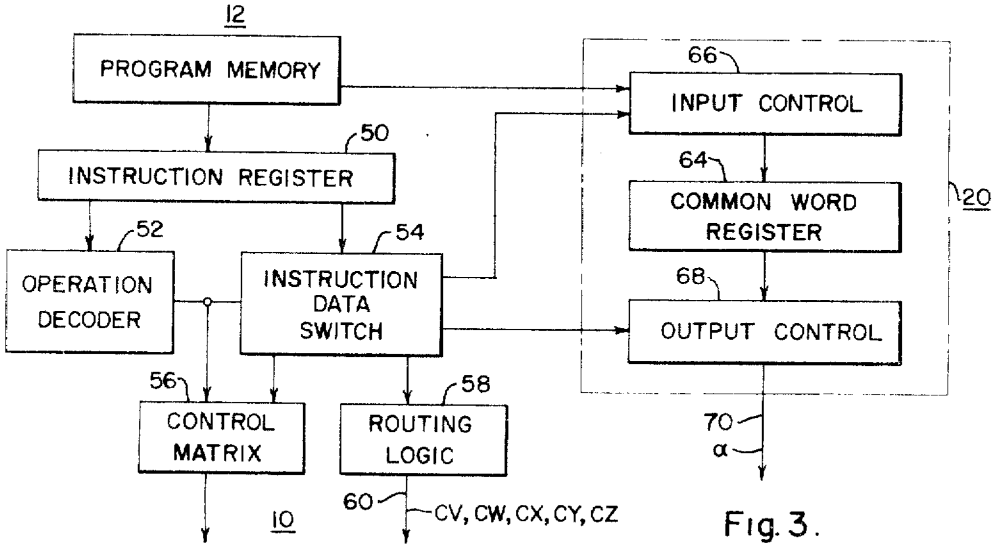
FIG. 3 illustrates a portion of a central control means for controlling the illustrative embodiment of the present invention.

Referring now to FIG. 1, there is shown a typical array of processing elements, with the processing elements labeled PE1 to PE16. Although the square array shown comprises 16 processing elements, more or fewer, processing elements may be utilized in other predetermined arrays. Each processing element has the ability to communicate with predetermined other processing elements in the array and by way of example, FIG. 1 shows each processing element communicating with its four nearest neighbors. In the computer described herein, each processing element is under simultaneous control of a central control unit 10 having an associated central program memory 12. Basically, the central control unit contains the central program memory 12, has the means to retrieve and interpret stored instructions, and the capability to cause execution of these instructions within the processing element array. Since identical control signals are sent to the processing elements from the central control unit 10, it may be necessary to branch the information and provide proper amplification. To this end, there may be provided a branching unit 14 which accepts the signals from the central control unit 10 and transmits it at a higher power level to all of the processing elements in the array. One such computer thus far described is more fully described and claimed in a copending application by Daniel L. Slotnick, Ser. No. 242,234, filed Dec. 4, 1962 and assigned to the assignee of the present invention. The present invention finds use with such a system described, and is shown in FIG. 1 as the common word source 20. The common word source 20 may be controlled by the central control means 10, and may be loaded with data, in the form of digital words, from the central program memory 12 to thereby store the data and upon proper command send it simultaneously to selected processing elements via the branching unit 14. The common word source 20 may also be loaded with data from an external means and by way of example the input-output unit 16 may supply a constant word to the common word source 20 for use in various mathematical or logical problems.

Since all of the processing elements in the array are similar, a typical processing element will be described with respect to FIG. 2. The processing element includes a first memory and control means designated as the frame 1 memory and control 22, and a second memory and control means designated frame 2 memory and control 24. These memory frames have the ability to store a plurality of multi-bit words and a typical memory may have the capacity to store several thousand bits. In order to perform the desired logic operations and desired arithmetic operations, there is provided a logic and arithmetic unit 30 which is capable of performing serial by bit arithmetic operations on information stored in the memory frames. The results of any logic or arithmetic operations may be selectively stored in either the frame 1 memory 22 or the frame 2 memory 24 and the frame selection means 32 is provided to perform this selective storage operation. The frame selection means 32 is additionally operable to transfer information between the memory frames, that is, information in the frame 1 memory 22 may be transferred to the frame 2 memory 24 and information in the frame 2 memory 24 may be transferred to the frame 1 memory 22. The mode control unit 40 is provided and is responsive to conditions within the processing element to provide a first control signal to alter commands specified by the central unit 10. Basically, if these predetermined conditions are met, in one embodiment, the mode control unit 40 will allow the associated processing element to carry out the command specified by the central control means 10. The operation of the mode control unit 40 in each processing element may be such that all of the processing elements of the matrix array will carry out the specific commands designated by the central control, or alternatively only preselected processing elements may be designated to carry out the specific command. One such mode control unit 40 is more fully described and claimed in a copending application by W. C. Borck, Jr. and R. C. McReynolds, Ser. No. 242,233, filed Dec. 4, 1962 and assigned to the assignee of the present invention. An operation selection means 34 is provided to not only control the logic and arithmetic unit 30 during certain operations, but also to pass preselected bits, or their complements, involved in the operations, and which bits may be located in the frame 1 memory 22, the frame 2 memory 24 or the frame 1 memory of a neighboring processing element. As was stated, each processing element in the array is capable of communication with other preselected processing elements in the array. Routing means 42 is provided and is operable to route information in the frame 1 memory 22 to its associated processing element or to one of four nearest neighbors upon the receipt of predetermined control signals from the central control means 10. The routing means 45 may be additionally operable to be the medium of exchange of information from the frame 1 memories of the four nearest neighbors. FIG. 2 additionally shows the routing means 42 as the unit for the reception of the data from the common word source 20. In FIG. 2, the processing element is shown as receiving information directly from the central control means 10 in addition to having the routing means 42 receive information directly from the common word source 20, and for sake of clarity the branching unit 14 has been omitted.

As was stated, many mathematical or logical operations require the use of a constant in the solution of a great many problems. Heretofore, this constant was loaded into each of the memory means associated with each processing element involved in the computation, and if a particular problem involved a great number of constants, this represented a waste of space in the memory means of the processing element. The present invention, under control of the central control means 10, not only alleviates this problem, but provides for a faster operating parallel network type of computer and to this end reference is now made to FIG. 3.

FIG. 3 shows a portion of the central control means 10 and a fuller description of a typical central control means may be had by referring to the aforementioned copending application, Ser. No. 242,234. An instruction is retrieved from the program memory 12 and sent to the instruction register 50, in a well known manner. The operation portion of the instruction is fed to the operation decoder means 52 and the remainder of the instruction is sent to the instruction data switch 54 which is operable, upon additional signals received from the operation decoder 52, to provide a plurality of necessary control signals utilized in a typical operation. The output of the operation decoder 52 is also fed to the control matrix unit 56, and with information received from the instruction data switch 54, the control matrix unit 56 will be operable to provide a plurality of control signals to the array of processing elements to perform the operation specified in the operation portion of the instruction. The instruction data switch 54 and the control matrix unit 56 may both be diode decoding matrices which are well known in the art. The routing portion of the instruction is decoded, sent to the routing logic means 58 which then generates one of the desired routing signals designated CV or CW or CX or CY or CZ on the plurality of leads designated 60. As was stated, the common word source 20 may be under the control of the central control means 10 and to this end there is provided an input control unit 66 and an output control unit 68 which receive control signals from the instruction data switch 54 in response to the predetermined program, or operation as designated by the instruction in the instruction register 50. A common word register 64 is provided to store a constant which is to be used in a desired operation. This constant may be loaded into the common word register 64 from the program memory 12 which transfers the constant to the input control 66 which will then set the common word register 64 in response to a control signal from the instruction data switch 54. Once the constant has been loaded into the common word register 64, it may be sent to selected processing elements along the lead 70 and which constant signal is designated as $\alpha$. The selected processing elements will therefore simultaneously receive this constant $\alpha$ when the output control unit 68 is so instructed to transmit the constant to the processing element matrix array. By use of the mode control unit 40 (FIG. 2), the constant $\alpha$ may be utilized by a portion, or all of the processing elements. Once the constant $\alpha$ is available for use by the processing elements, it must be transmitted to them for use in the desired logic or arithmetic operation, and to this end reference is now made to FIG. 4.

Figure 4:
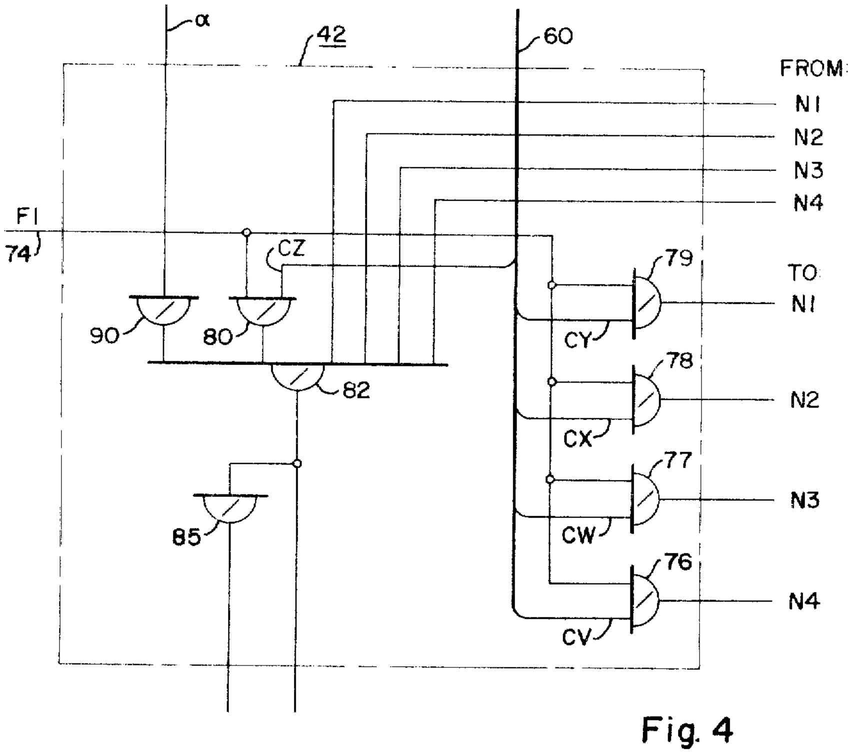
FIG. 4 is a schematic electrical diagram illustrating a portion of the processing element in more detail.

FIG. 4 shows in more detail one type of routing means which may be utilized herein to transfer the constant $\alpha$ as well as other data to the logic and arithmetic means of the processing element. The routing means 42 is shown to comprise a plurality of gates which take the form of STROKE gates (NAND gates). An operand from the frame 1 memory 22, which operand is designated as F1 is fed via the lead 74 to a plurality of STROKE gates 76, 77, 78, and 19. These latter STROKE gates, in addition to the F1 operand signal, receive the routing signals from the routing logic 58 along a lead in the plurality designated 60 such that STROKE gate 76 receives the CV signal, STROKE gate 77 receives the CW signal, STROKE gate 78 receives the CX signal and STROKE gate 79 receives the CY signal. These signals, CV to CY are normally ZEROS and by selectively making one of them a ONE, the F1 operand may be routed to any of the neighbors, N1 to N4, as designated by a particular instruction. In order to route the F1 operand to the logic and arithmetic means of its associated processing element, there is provided STROKE gate 80, to receive the F1 operand in addition to a CZ gating signal from the routing logic means 58. The output of STROKE gate 80 is fed to a STROKE gate 82, which in addition, receives the output from STROKE gate 76 from a first neighboring processing element, the output from STROKE gate 77 of a second neighboring processing element, the output from STROKE gate 78 from a third neighboring processing element and the output from STROKE gate 79 from a fourth neighboring processing element. By making the CZ gating signal a ONE, the STROKE gate 80 is enabled to pass the F1 operand through to be reproduced by the STROKE gate 82. In order to have the complement of the operand available, there is provided a STROKE gate 85 which inverts the output of the STROKE gate 82. The STROKE gate 82 may also function to reproduce the constant word α provided by the common word register 64 by the provision of STROKE gate 90. STROKE gate 90 may be operable to receive the constant α from the common word source and by making the signals CV to CZ all ZEROS, STROKE gates 76, 77, 78, 79 and 80 are all blocked such that STROKE gate 82 will receive the output signal from STROKE gate 90 to thereby reproduce the constant α which may then be utilized in that processing element in the desired logic or arithmetic operation. The mode of operation just described takes place in every selected processing element of the matrix array.

A typical processing element matrix array may comprise over a thousand individual processing elements and if several constants are needed in a certain operation, the inclusion of the present invention would eliminate the need of taking up several thousand word locations in the memory means of the processing elements in the array. Accordingly, there has been provided means for effectively increasing the storage capacities of the individual memory means of the processing elements in addition to decreasing the time needed to load the individual memory means with the necessary constants.

Although the present invention has been described with a certain degree of particularity, it should be understood that the present disclosure has been made by way of example and that changes in the combination and arrangement of parts obvious to one skilled in the art may be restored to without departing from the scope and spirit of the invention.

What is claimed is:

1. A computer comprising:
(1) central control means;
(2) an array of processing elements all under simultaneous control of said central control means and receiving identical control signals therefrom;
(3) each said processing element including
  (a) memory means for storing information,
  (b) means for carrying out operations specified by said central control means on said information, and
  (c) routing means for transferring and receiving information to and from other preselected processing elements of said array; and
(4) common word means for storing an information word, and operable, upon proper command, to transfer said information word simultaneously to two or more of the processing elements of said array for use as data in the solution of various problems.

2. In a parallel network computer having a plurality of processing elements receiving identical control signals from a central control means for selectively performing desired logic and arithmetic operations on information stored in memory means associated with each processing element, the improvement comprising:
(1) register means for storing information words for use as data;
(2) transfer means for transferring an information word from said register means to two or more processing elements for carrying out, simultaneously, desired operations upon said information word.

3. A computer comprising:
(1) central control means;
(2) a plurality of processing elements under simultaneous control of said central control means;
(3) each said processing element including;
  (a) memory means for storing data,
  (b) logic and arithmetic means for carrying out predetermined operations on said data in response to control signals from said central control means,
  (c) routing means for transferring said data to the logic and arithmetic means of other preselected processing elements and for receiving the data from said other preselected processing elements; and
(4) register means for providing a stored digital word and operable to transfer said stored digital word to the logic and arithmetic means of two or more of said plurality of processing elements for use as data in certain operations thereby eliminating the need to store said digital word in said memory means of said processing elements.

4. In a parallel network computer including a central control means and a central program memory for controlling an array of identical processing elements in the solution of various logic and arithmetic problems, the improvement comprising:
(1) a common word source;
(2) input means for said common word source for transferring a word in the central memory to said common word source;
(3) output means responsive to an instruction from said central control means to transfer a word in said common word source, simultaneously, to two or more processing elements of the array for use as data in the solution of said problems.

5. In a parallel network computer including a central control means and a central program memory for controlling an array of identical processing elements in the solution of various logic and arithmetic problems, the improvement comprising:
(1) a common word source;
(2) input means for said common word source for transferring a word from an external means to said common word source;
(3) output means responsive to an instruction from said central control means to transfer a word in said common word source, simultaneously, to two or more processing elements of the array for use as data in the solution of said problems.

6. A computer comprising:
(1) a central control means;
(2) an array of processing elements under simultaneous control of said central control means;
(3) common word means for storing an information word for use as data by two or more processing elements for carrying out, simultaneously, desired operations including said information word;
(4) each said processing element including;
  (a) memory means for storing data,
  (b) logic and arithmetic means for carrying out desired operations designated by said central control means, and
  (c) routing means including a plurality of gates for receiving said data from said memory means and operable in response to routing signals from said central control means, to route said data to said logic and arithmetic means or to other preselected processing elements, depending upon said routing signals, said routing means additionally operable to receive the information word from said common word means to gate said word to said logic and arithmetic means in the absence of said routing signals.

References Cited by the Examiner

UNITED STATES PATENTS

| | | | |
|---|---|---|---|
| 2,651,458 | 9/1953 | Bennett et al. | 235—61 X |
| 3,030,019 | 4/1962 | Smith | 340—172.5 |
| 3,200,380 | 8/1965 | MacDonald et al. | 340—172.5 |
| 3,242,467 | 3/1966 | Lamy | 340—172.5 |

ROBERT C. BAILEY, *Primary Examiner.*

I. S. KAVRUKOV, *Assistant Examiner.*